United States Patent [19]

Gratziani et al.

[11] Patent Number: 5,074,802
[45] Date of Patent: Dec. 24, 1991

[54] PNEUMATIC-ELECTRIC QUICK DISCONNECT CONNECTOR FOR A PLASMA ARC TORCH

[75] Inventors: Isaac Gratziani, Enfield, N.H.; Nicholas A. Sanders, Norwich, Vt.

[73] Assignee: Hypertherm, Inc., Hanover, N.H.

[21] Appl. No.: 406,035

[22] Filed: Sep. 12, 1989

[51] Int. Cl.$^5$ .............................................. H01R 4/60
[52] U.S. Cl. .................................... 439/192; 219/75; 439/181
[58] Field of Search ............... 219/75, 121.49, 121.51, 219/121.52, 137.63; 285/41, 137.1; 439/190, 191, 192, 193, 194, 195, 196, 197, 198, 246, 247, 252, 181, 186, 187, 312, 320, 919, 934

[56] References Cited

U.S. PATENT DOCUMENTS

| 3,544,758 | 12/1970 | Nolin | 219/137.63 |
| 4,600,824 | 7/1986 | Moerke | 219/137.63 |

*Primary Examiner*—Eugene F. Desmond
*Attorney, Agent, or Firm*—Wolf, Greenfield & Sacks

[57] ABSTRACT

A quick disconnect connector for both electrical power and gas flow to a plasma arc torch has a plug that includes at least one pin contact and a mating receptacle that includes at least one socket contact that receives the pin contact axially. Both contacts have a central axial passage that conducts the gas flow at a sufficient rate to cool the contacts when they are conducting a large heavy operating current, typically 20 to 1,000 amperes, D.C. For high voltage operation, each contact is closely surrounded by a barrier sleeve of a dielectric material which is supported in an insulating body filling the plug or receptacle. The sleeved contacts are mounted to pivot independently of one another about a central mounting boss for self-alignment on mating. O-rings seal the sleeves to the insulator bodies to restrict the gas to a connection zone of the connector. The sleeve barrier axial length and that of the insulating bodies exceed the minimum tracking distance at the high voltages (typically 5 KV) and high frequencies (typically 2-3 mHz) associated with start-up of the torch.

12 Claims, 4 Drawing Sheets

PNEUMATIC-ELECTRIC QUICK DISCONNECT CONNECTOR FOR A PLASMA ARC TORCH

BACKGROUND OF THE INVENTION

This invention relates in general to electrical connectors. More specifically, it relates to a hybrid electrical-pneumatic connector between (i) a gas flow and a high current, high voltage, high frequency power supply and (ii) a plasma arc torch.

Plasma arc torches for welding and cutting metal require high D.C. currents during normal piercing, cutting or welding operations, e.g. 20 to 1,000 amperes, but they also require high voltages at a high frequency to initiate the arc on start up A typical voltage is 5 KV and typical high frequencies are 2 to 3 mHz. The arc also requires a supply of a gas that can be ionized to form the plasma arc.

A problem inherent in these operating conditions is that the high voltage, high frequencies conducive to producing an arc at the torch will also produce an arc between the electrical power conductor of a connector and any nearby metal such as another conductor or the housing. Along any possible clear air path between metal and the current carrying conductor must be maintained above a minimum value for this "tracking distance" to avoid arcing. If an arc occurs upon application of the high frequency, high voltage, then when the large direct current begins, this current will shorted-out and destroy the connector because the high D.C. current follows the arc.

Other problems are that any connection arrangement must also supply the gas, must have large electrical conductors sized to carry the large currents, and the connector system must be able to dissipate the heat produced by the resistance heating of the heavy currents. The heat dissipation is particularly important if the connector includes multiple high current conductors. Heat dissipation problems often control the design and size of a connector in such a system. In general, known multiple conductor, high current connectors are large.

The current standard industry practice is to connect the power and gas supplies to the plasma arc torch using leads, often 25 or 50 feet in length, that are connected inside the power supply permanently. In the leads it has been adequate to place the electrical conductor in an insulating, gas-carrying tube. This arrangement, however, does not allow a quick disconnect, and it is not satisfactory for the connection at the power supply. Whenever the power supply or torch is changed, or whenever the system is moved or shipped, a licensed electrician must be called to open the power supply and disconnect, connect or change the leads. Changing torches or power supplies therefore becomes a cumbersome, time-consuming task. There is clearly a great advantage to being able to disconnect the leads quickly, without the services of a specially trained individual, but no connection system currently available meets all of the aforementioned requirements while also providing a quick connect and disconnect in the field.

Of course, a wide variety of plug-type electrical connectors are known for use in other applications, and a few replaceable, quick connect/disconnect connectors are known for use with plasma arc torches. However, they all have disadvantages which limit their value as solutions to all of the competing design objectives delineated above. One connector used in conjunction with a plasma torch, at least in Europe, connects both the gas and power supplies to the torch, but the electrical power is limited to a high current only. High voltages at a high frequency are simply not put through this connector. It therefore is of limited value. Another connector for use with a plasma torch, also known at least in Europe, is a large, conventional design plug and receptacle electrical connector. It does convey a gas through passages in the conductors, but the conductors are large in cross section, comparable to the AWG size of standard conductors used to carry the same current. The conductors are also spaced within the connector in a conventional manner. As a result, this connector is quite large and therefore difficult to manipulate, costly to manufacture, and it requires a relatively large force to insert the plug into the receptacle to make a connection. The insertion problem is due in part to the stiffness of the resilient components and in part to the difficulty in achieving a good alignment of the mating components as they are manually aligned and forced together. None of the known connectors supply gas and electrical power (both at high D.C. current levels and at high voltage (5 KV) and high frequency) while controlling arcing in the connector, controlling gas leakage, and allowing a quick, reliable connect or disconnect with no special skills.

It is therefore a principal object of the present invention to provide a hybrid gas and electrical power that carries power at both high D.C. current levels and at high voltages and high frequencies which can be connected and disconnected quickly and with a low skill level.

It is a further object to provide a connector with the foregoing advantages that is compact as compared to comparably rated conventional electrical connectors.

Another object is to provide a connector with the foregoing advantages that has good heat dissipation characteristics and a low insertion force as compared to comparably rated conventional electrical connectors.

A further object is to provide a connector with the foregoing advantages that also reliably seals the gas flow within the connector.

Yet another object is to provide a connector with the foregoing advantages that control arcing.

Still another advantage is to provide a connector with the foregoing advantages that allows a flexibility in manufacture to meet a range of applications utilizing the same basic construction.

Another object of the present invention is to provide a connector with the foregoing advantages that is reliable in its operation and which has a favorable cost of manufacture

SUMMARY OF THE INVENTION

A quick disconnect connector for both electrical power and gas flow to a plasma arc torch has a plug that includes at least one pin contact and a receptacle that includes at least one socket contact that mates axially with the pin contact. Both contacts have a central axial passage that conducts the gas through the entire contact at a sufficient rate to cool the contacts even when they are conducting a high operating current. In a preferred form where the connector also supplies a high voltage, each contact is closely surrounded by a barrier sleeve of a good insulating material molded on the contact, which is supported in an insulating body filling the plug or receptacle. The sleeved contacts are mounted to pivot about an axially central boss for self-alignment on mating. O-rings seal the sleeves to the insulator bodies to contain the gas within a connection zone of the connector. The axial length of the sleeve barrier and the insulator bodies exceed the tracking distance for the high voltages and frequencies used to start the torch.

In the preferred form for two power conductors, the barrier sleeves and insulator bodies are formed of a high dielectric constant material and the barrier sleeves are molded onto the contacts. The barriers and insulator bodies have mating recesses and bosses which restrict an axial movement of the contacts and their barrier sleeves. However, the contacts or the barrier sleeves are mounted to wobble about a central boss engaged in a mating recess in the adjacent insulator body. The socket contact is split axially so that the radial sections can flex outwardly when the pin contact is inserted into the socket. This develops a spring force that enhances the electrical connection between the contacts. The insulator bodies for the plug and receptacle are each formed in two pieces that sandwich the barrier sleeves to secure them axially. A retaining ring hold the insulator bodies in place A locking nut rotatable on the plug or receptacle shell threads onto the other shell to secure the connector in the mated position.

The O-rings seals for the pin sockets are preferably carried in a beveled grooves formed on an end face of on insulator body The end face of the other insulator body abuts the O-ring to compress it and enhance the seal as the lock nut is tightened. The o-ring seal on the socket barrier sleeve is carried in a transverse channel on the outer surface of the sleeve. The seal blocks a gas flow, but will pass an arc. The tracking distance from the pin and socket contacts at the connection zone to the nearest conductor, typically the shell or another conductor, is determined by the axial length of the barrier sleeve between these two metal-air interfaces.

The connector preferably also includes at least a pair of low power control contacts of the pin and socket type secured in the insulator bodies of the plug and receptacle, respectively. These control contact extend axially for a distance such that on disconnect they break electrical connection before the main power pin and socket contacts break connection. This arrangement can be used to control a relay which in turn controls the power to the torch.

These and other features and advantages will be more readily understood from the following detailed description which should be read in light of the accompanying drawings.

DETAILED DESCRIPTION OF THE PREFERRED EMBODIMENTS

Figure 1:
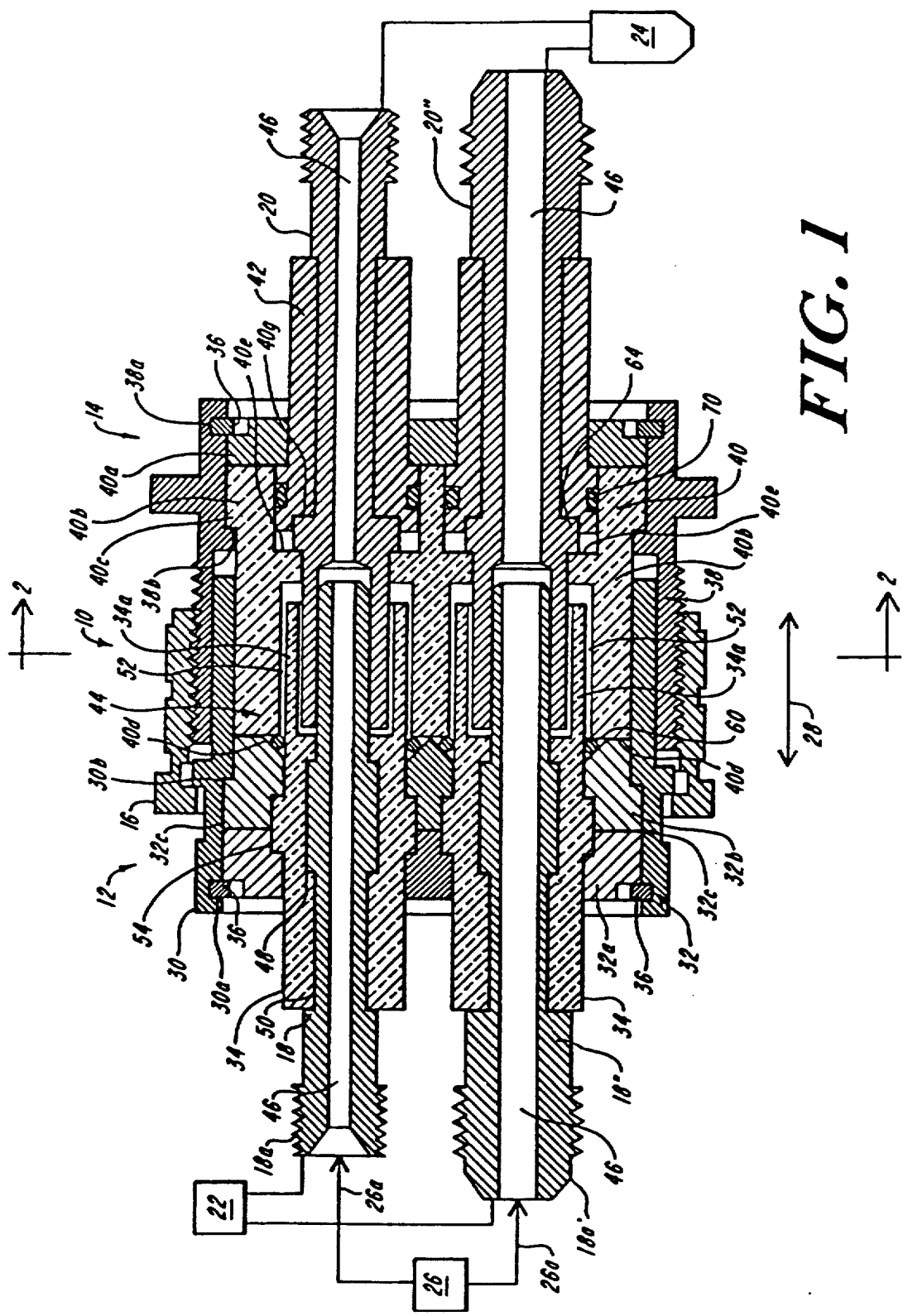
FIG. 1 is a view in vertical cross section of a hybrid pneumatic-electric connector according to the present invention having two main power conductors.

FIG. 1 shows a hybrid, pneumatic-electric connector 10 according to the present invention having two main power conduction paths. It has a plug 12 and a receptacle 14 shown secured by a lock nut 16 in a fully connected position. The plug carries two pin contacts 18,18" and the receptacle carries two socket contacts 20,20" that receive and connect to the pin contacts 18,18". When connected as shown, these contacts form two parallel main conductors for the main power from a conventional plasma arc power supply 22 to a plasma arc torch 24. The pin contacts 18 and 18" differ slightly in the configuration of their external connection ends 18a,18a' to distinguish a contact that carries a high current and high voltage from the other contact which typically carries only a high voltage, high frequency, typically at a current level measured in milliamperes. The high current, in contrast, is typically 20 to 1,000 amperes supplied at about 300 volts. It powers the torch during normal welding, piercing and cutting operations. A conventional gas supply 26 provides a flow 26a of gas that is ionized at the torch to produce the plasma arc. The plug and receptacle connect and disconnect from one another through a mutual axial movement along the direction 28. The locking nut 16 draws the plug and receptacle together to the fully mated position shown. A key 38c extends axially along the interior surface of the receptacle shell 38 and mates with an axial slot 30c in the plug shell 30. The key aligns the plug and receptacle circumferentially so that the pin contacts remain aligned with the socket contacts as the shells are mated, the contacts are not visible, and the nut 16 is tightened to mate the contacts. To disconnect, the nut is rotated to unthread it from the receptacle, and then the plug and receptacle are then manually drawn apart along the direction 28.

The plug includes a generally cylindrical hollow shell 30, an insulator body 32 having two axially stacked pieces 32a,32b in a face abutting relationship, barrier sleeves 34 that closely surround a central potion of each pin contact 18,18", and a retaining ring 36 held in a groove 30a in the plug shell that secures the insulator bodies and the other components of the plug captured in the insulator bodies within the plug shell.

The receptacle has a corresponding construction. A generally cylindrical receptacle shell 38 holds an insulator body 40 having two axially stacked pieces 40a,40b in a face abutting relationship, barrier sleeves 42 closely surrounding each socket contact, and a retaining ring 36 held in a groove 38a in the receptacle shell. Each insulator body 32,40 has an outwardly projecting boss 32c,40c that is captured at one end between a step recess 30b,38b, respectively, on the interior surface of the plug and receptacle shells and at the other end the retaining rings 36,36. This arrangement allows for ease of assembly or disassembly for repair or reconfiguration, while securing the insulator body pieces in a face abutting relationship and securing the entire insulator body against axial movement with respect to its associated shell. The plug and receptacle shells are typically metallic and preferably are standard military connector shells widely available under the trade designation Amphenol ® in a graduated range of sizes. As shown, the receptacle shell has a slightly larger diameter than the plug shell so that they overlap one another to provide mechanical strength and stability to the connector when it is mated. The insulator bodies and barrier sleeves are formed of an insulator material with a high dielectric constant, preferably the plastic sold under the trade designation Noryl ®, and in particular type EN 265.

An important aspect of the present invention is that the pin and socket contacts each have central, longitudinally extending passages 46,46 that extend completely through each of the contacts. The passages are centered within the contacts so that they are aligned when the pin and socket contacts are mated. The cross-sectional configuration of the pin and socket contacts and the central passages are generally circular to provide a substantially uniform wall thickness for the pin or socket contact. The dimensions of the contacts and the passages will vary depending on the application. However, the central passages 46,46 should be sufficiently large that they can readily conduct all of the gas flow required by the torch and at a sufficient rate to cool the contacts which are resistance heated by the high direct current flow carried through the contacts during normal welding, cutting and piercing operations. A countervailing consideration is that the gas low passage cannot be too large in comparison to the typical outside diameter of the contact or else the cross sectional area of the conductive material of the contact available to conduct a current low is not sufficient to carry the high current load required. By way of illustration but not of limitation, for a known hand-held plasma arc torch operating with a direct current of 150 amperes, the contacts have an outside diameter of approximately 0.20 inch and the central passage has a diameter of approximately 0.15 inch. It has been found that a hollow tube contact of the present invention carrying this D.C. current can be effectively cooled with a gas flow of 8 scfm where the gas is air. Of course, the conductor dimensions, current levels, and gas flow rates will vary depending on the application. It has also been found that the main power conductors of the present invention can have a lower AWG number than used in prior art designs to carry the same current.

Figure 2:
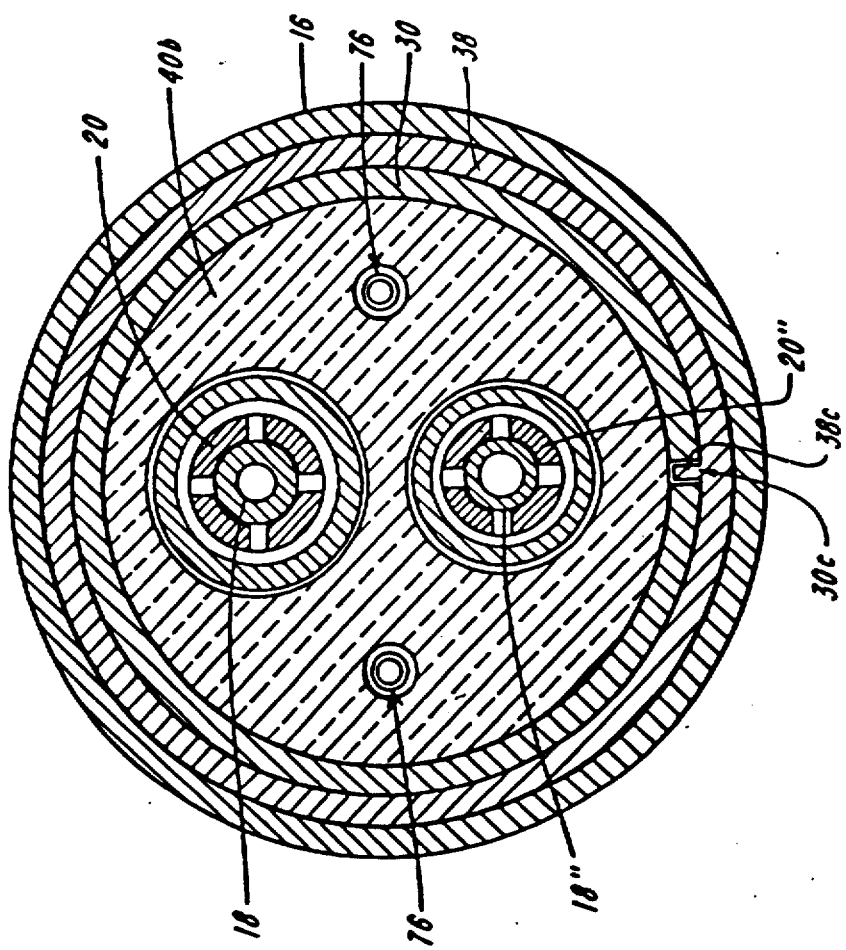
FIG. 2 is a view in cross section along the line 2—2 in FIG. 1.

Because of the enhanced heat dissipation characteristics of the present invention, power conductors can be packed much more closely within the connector than had heretofore been possible given the heat dissipation characteristics of conventional conductors and connectors. As a result, the gas cooled contacts of the present invention allow the design of the connector having substantial heat dissipation advantages and a substantial advantage in compactness as compared to prior art connectors. By way of example, a conventional connector for plasma arc torch with only one contact has a diameter slightly more than 2 inches. In contrast, the connector of the present invention can package two main power conductors, as shown in FIGS. 1 and 2, in a connector having an overall diameter that is also slightly more than 2 inches, and is also substantially short r than this prior art connector.

Figure 4:
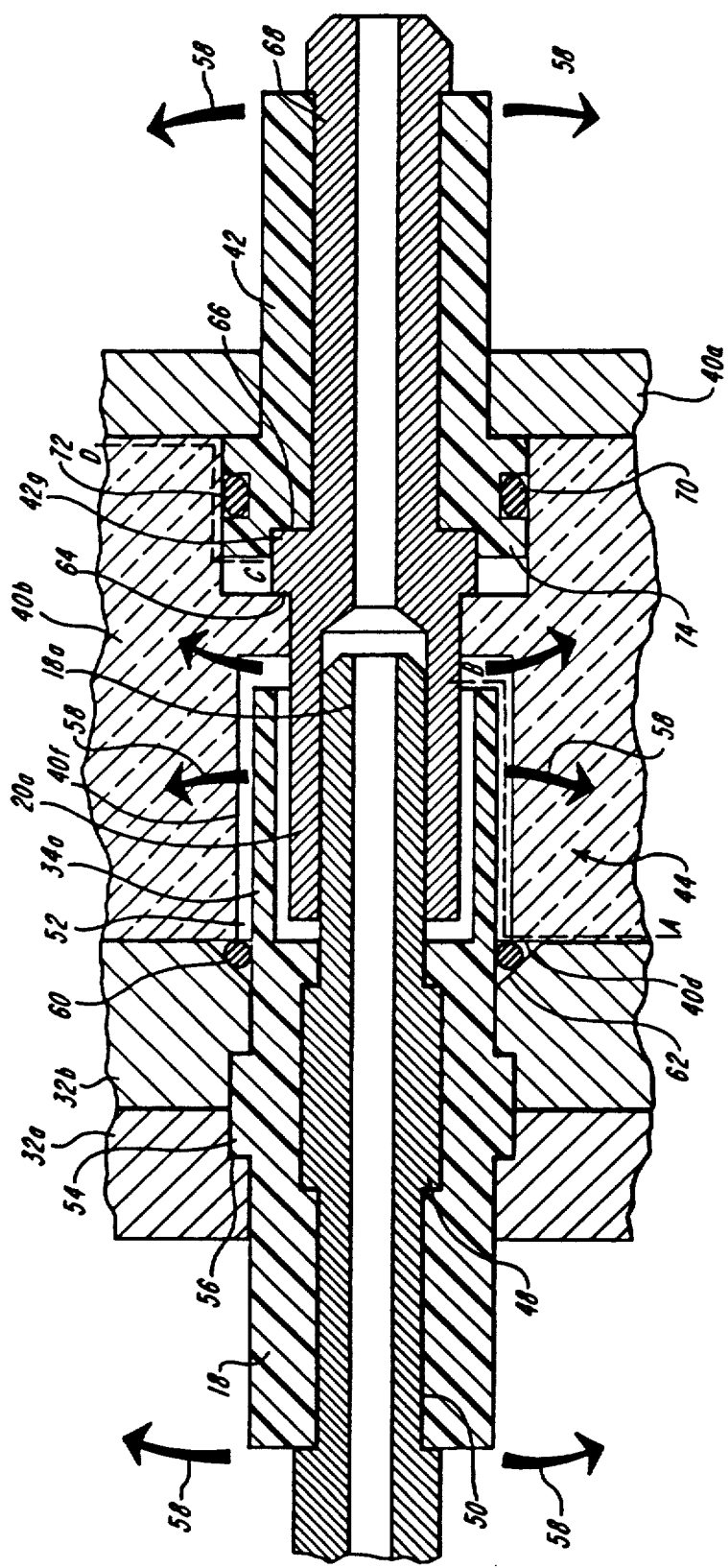
FIG. 4 is a detailed view in vertical section of the pin and socket contacts of FIGS. 1 and 2 with their associated arcing controls and gas seals.

With particular reference to FIG. 4, it will be noted that each of the pin and socket contacts and their associated barrier sleeves have axially extending recesses or bosses which are complementary. In particular the pin contacts 18,18" have a central boss 48 and an adjoining recess 50 which are in an intimate contact with complementary recesses and bosses on the surrounding barrier sleeve 34. The barrier sleeve is preferably molded directly onto the contact to avoid any possibility of an air path forming between the barrier sleeve and the contact which may provide a shortened path for an arc to develop between the pin contact and a metallic component of the connector such as the plug shell or an adjacent conductor. This matching pattern of bosses and recesses locks the pin contact and sleeve together to resist an independent axial movement. The bonding of the molding process resists axial and other forces directed tangential to the contact barrier sleeve interface which would tend to delaminate the barrier sleeve from the contact.

The barrier sleeve 34 associated with the pin contact has an end portion 34a which surrounds the connecting tip of the pin contact in an annular spaced relationship with respect to the pin contact and the mated socket contact end, as shown in FIG. 4. The length of this annular end portion 34a controls the free air path between the socket contact and adjacent conductor as denoted by the dash line between the points A and B in FIG. 4. It should be noted that there is also an annular clearance 52 between the outer surface of the barrier shield portion 34a and the inner surface of the surrounding receptacle body piece 40b. These ends of the pin and socket contacts and their barrier sleeves defining the connection zone 44 are therefore not mechanically restrained from a side-to-side movement at any angle to the longitudinal axis of the contact. For a typical contact having a length of approximately 2.0 inches, a maximum lateral excursion of about 0.025 inch has been found to be adequate to achieve the proper operation The barrier sleeves 34 have a generally centrally located and outwardly projecting boss 54 which is captured in a mating recess 56 formed in the surrounding surface of the insulator body pieces 32a,32b by step recesses in the opposed end faces of these body pieces. As shown, the axial length of the insulator body 32 extends over only a relatively short central portion of the barrier sleeve and the associated pin contact, including the boss portion 34b of the sleeve which locks the barrier sleeve and its contact against an axial movement with respect to the insulator body, and therefore the plug. But the barrier sleeve and the insulator body are dimensioned and toleranced so that there is a slight "play" or freedom of movement of the barrier sleeve within the insulator body to allow a side to side pivoting or a revolving of the insulator sleeve with respect to the insulator body about the central boss 34b. This side to side or wobbling movement is illustrated by the double headed arrows 58 in FIG. 4. This construction runs contrary to conventional constructions which firmly secure the electrical contact within a surrounding body of insulating material to avoid air paths associated with movement of the conductors. This motion allows the pin contact to become self-aligning with respect to the mating socket contact upon insertion. It also reduces the force required to make the connection.

Because there is gas present at the connection zone 44, it is necessary to confine any gas that leaks out of the conduit passages 46,46. An O-ring 60 around each barrier sleeve is seated in a bevel groove 62 formed in the insulator body piece 32b immediately adjacent the abutting end face 40c of the shell insulator body 40b. The O-ring 60 is sized to establish a fluid tight seal between the outer surface of the barrier sleeve 34 and the surrounding insulator body 32b as well as the adjacent end face 40d. The O-ring is preferably compressed slightly between the plug and the socket insulator bodies as they are tightened into the final mating position to ensure that there is a tight sealing relationship between the O-ring and all of the surrounding surfaces. Because the O-ring is elastic, it will maintain this fluid tight seal movement of the pin Contact during mating.

While the mounting and sealing system described provides self-alignment and gas containment, it also provides a long free air path between the metal-air interface of the current carrying contacts and other metal components of the connector. In particular, the annular spaced sleeve portion 34a extends the free air path from the point B (which will be understood to be at an adjacent conductor in the connector that the arc reaches by following the gap between the insulator body pieces) to the point A shown in FIG. 4. This greatly enhances the resistance of the connector to internal arcing upon the application of a high voltage such as 5 KV.

Similar construction features and design objectives are obtained in the receptacle 14 utilizing barrier sleeve, socket contact and insulator body pieces of slightly different configuration, but using under the same general features. More specifically, the socket contacts 20,20" have a boss 64 captured between a step recess 42g in the innermost end face of the socket barrier sleeve 42 and an opposed interior step recess 40e formed in the insulator body piece 40b. This action secures the socket contact against a axial movement with respect to the receptacle insulator body, or the receptacle as a whole. The barrier sleeve 42 is mated intimately with the outer surface of the socket contact, as by molding, and fills a recess 68 in the outer surface of the socket contact. The insulator body piece 40b has a circular recess 40f which surrounds the pin and socket ends in the connection zone as well as the barrier sleeve portion 34a. The recess 40f has an annular clearance around the barrier sleeve 40 so that the socket contact, like the pin contact, is supported only at a central portion with its mating end and its outer end projecting to the right of the receptacle shell, as shown in FIG. 1, are free to move laterally about a central boss 74 which acts as a pivot point. Again, as with the plug contact, the socket contact and its surrounding barrier sleeve are manufactured with dimensions and tolerances such that, as are the supporting insulator body pieces 40a and 40b, that while the socket contact and its barrier sleeve are locked against an axial motion, they are free to move laterally a small distance, with a 360° freedom of motion about the longitudinal axis of the contact when it is centered, as indicated by the double headed arrows 58 in FIG. 4.

To provide a gas seal despite this movement that contains the gas within the connection region, an O-ring 70 is mounted in a channel 72 formed in the outer side surface of the outwardly extending boss 74. The O-ring is sized with respect to the dimensions of the channel so that it provides a barrier seal against the flow of gas along the interface between the barrier sleeve and the surrounding insulator body. However, at the high voltages and frequencies associated with start up it is possible to have an arc path which by-passes the O-ring seal, as indicated by the dotted line extending between the points C and D in FIG. 4. (Again, point D will be understood to be at a metal-air interface of an adjacent conductive member.) The O-ring seal thus controls the movement of gas in the connector, but is not used to control the internal arcing problem.

Figure 3:
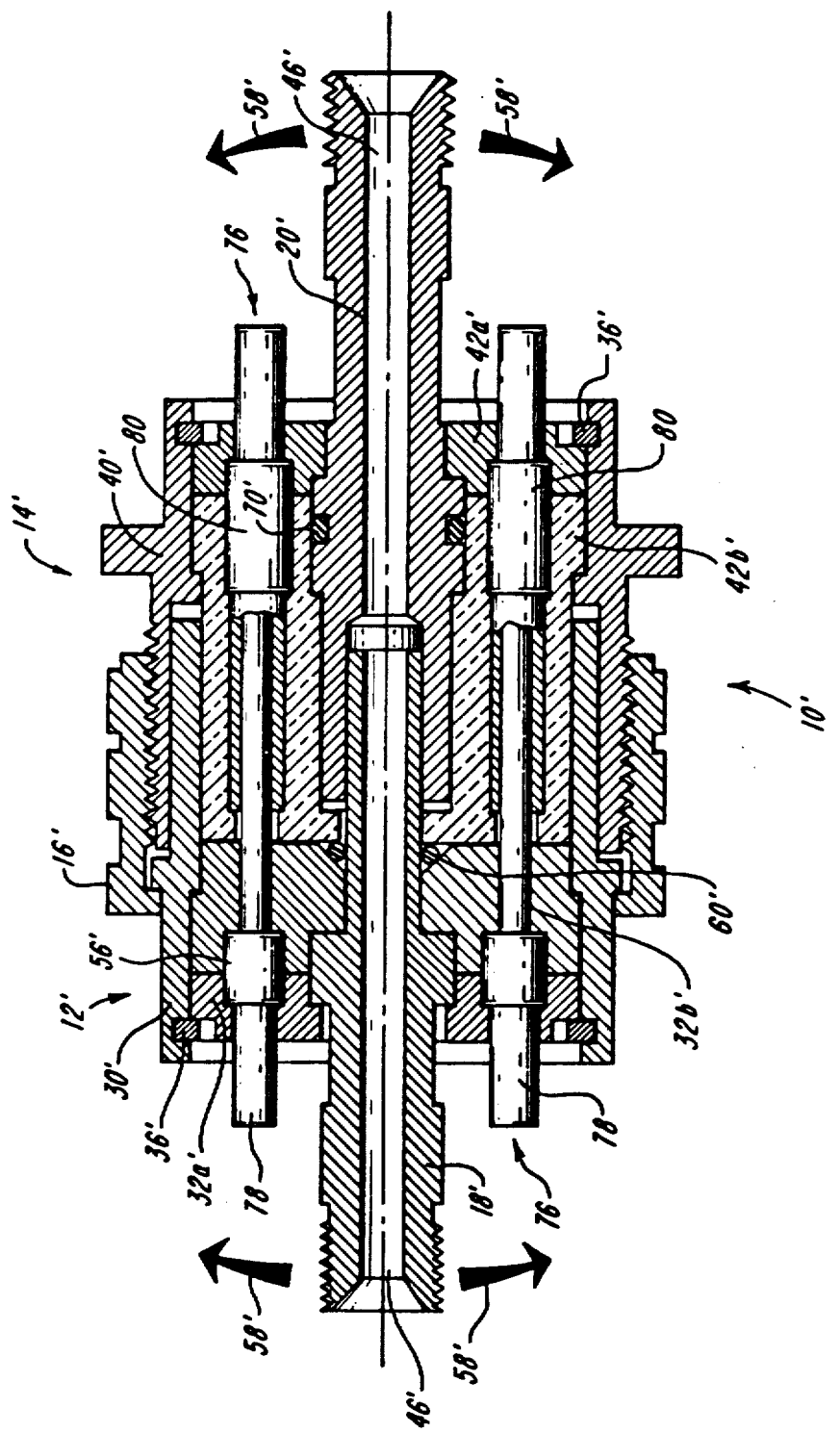
FIG. 3 is a view in vertical section corresponding to FIG. 1 of an alternative, single high current conductor embodiment of the present invention.

The mating ends 18a of the pin contacts, the right hand ends as shown in FIGS. 1 and 3, are rounded or tapered to facilitate their entry into the associated socket contact. This rounded end configuration, acting in cooperation with the ability of both the pin and contact assemblies to pivot to a mutual linear alignment, results in a comparatively low insertion force. In particular, it avoids the extreme situation where the ends of the pins and sockets abut one another to block insertion. Also, the socket contact ends 20a that receive and mate with the associated pin contacts are slit radially, as is best seen in FIG. 2. This allows the radial segments of the socket contact to flex outwardly in response to the insertion of the pin contact which has a slightly larger exterior diameter than the interior diameter of the socket contact end 20a when it is in its relaxed position, prior to being mated. The material of the socket contacts, typically a copper alloy such as bronze, is resilient so that when the sections of the end 20a are flexed outwardly, they exert a resilient spring force which drives the interior side walls of the socket contact into a reliable electrical connection with the exterior surface of the pin contact. The opposite end portions of the pin and socket contacts are threaded, as shown, to accept a screw-on coupling to a lead or to the power supply.

The connector construction described above allows the plug and receptacle to be readily disassembled for replacement, repair or inspection of the internal components, or to even allow for a reconfiguration of the contacts within the connector, i.e., changing the number, dimensions or the array of the conductors depending upon the application by replacing the insulator bodies and the associated contacts and O-rings. After unscrewing the lock nut and pulling the plug and receptacle apart, disassembly involves removing the retaining ring 36 to release the adjacent insulator body piece 32a or 40a with a simple sliding motion. This then frees the barrier sleeves for removal by an axial sliding motion away from the connection zone. The shell then presents no impediment to the simple sliding removal of the insulator body pieces 32b and 40b.

FIG. 3 shows alternative embodiment of the present invention which is similar in construction to the connector shown in FIGS. 1 and 2, except that it utilizes only a single power conductor formed by a pin contact 18' and a socket contact 20', like parts being identified with the same reference number as in the FIGS. 1 and 2 embodiment except that a single prime is used to denote the FIG. 3 embodiment. The plug 12' and receptacle 14' mate in a nested overlapping fashion and are secured by a locking nut 16' which draws the plug and receptacle into an electrical and pneumatic mating connection as shown in FIG. 3. A retaining ring 36' secures plug insulator body portions 32a and 32b in a plug shell 30' in a manner which sandwiches and secures a pin contactor 18' having an outwardly projecting transverse boss which is captured directly in the insulator bodies. A socket contact 20' similarly as a transverse boss which is sandwiched between socket insulator body pieces 40a' and 40b' which are secured in a body receptacle 38' by a retaining ring 36'. A principal difference between a FIG. 3 and FIG. 1 embodiments is that the FIG. 3 embodiment does not utilize the barrier sleeves which surround the contacts. This is because the connectors carry only one pin and socket contact pair and are not designed to also carry a high voltage.

The pin and socket contacts are mounted in the insulator bodies 32' and 40' at a central point and with the clearances and tolerances, as in the FIGS. 1 and 2 embodiment, to pivot or wobble laterally as indicated by the double headed arrows 58',58' about the central boss as a pivot point through a full 360° about the longitudinal axis of each contact. O-rings 60' and 70' surrounding the pin contact 18' and socket contact 20' confine the gas to the connection zone 44'. Because there are no barrier sleeves, the O-rings 60' and 70' provide a seal directly between the contacts and the surrounding insulator bodies.

FIG. 3 also illustrates two low power control contacts 76 provided by mating pairs of pins 78 and sockets 80 which themselves have central bosses 78a and 80a received in mating, recesses in the surrounding insulator bodies 32' and 40'. These contacts 78 and 80 also have a slight lateral side to side play about their central bosses to provide a mutual self adjustment upon insertion. The low power contacts have a somewhat longer connection, measured axially, than the main power contact 18',20'. As a result, during connection of the plug and receptacle, the low power contacts make contact after the gas, high-voltage and high-current contacts 18' and 20' have made their contact, and on disconnection they break connection before the main power contacts. With this design, the lower power control contacts can be used as a switch to control a relay external to the connector, which in turn controls the flow of power through the main power contacts to avoid arcing on make and break of the principal power connection between the contacts 18' and 20'. While two low power control contacts are shown, other numbers can be used, and a preferred embodiment has four. Similar low power control contacts are also utilized in a FIG. 1 and 2 embodiment, and they are as shown in FIG. 2. They are constructed and mounted the same way as the contacts 76.

There has been described a hybrid pneumatic-electric connect quick disconnect connector which can supply high current, high voltage and high frequency power to a plasma arc torch as well as a flow of gas to be ionized to form the plasma arc. The connector is self cooling which allows a compactness of design not heretofore attainable for connector carrying the power levels of the present design. The connector has a low insertion force, is simple to use, and is highly resistant to the internal arcing which could destroy the connector and potentially damage the power supply. The connector also achieves these objectives while reliably sealing the gas and utilizing conductors characterized by comparatively small AWG numbers as compared to conventional power conductors in prior art connectors carrying the same current.

While the invention has been described with respect to its preferred embodiments, it will be understood that various modifications and alterations will occur to those skilled in the art from the foregoing detailed description and the accompanying drawings. For example, the configuration of the plug shell and the design details of the insulator body can be varied greatly and remain within the scope of the invention. Similarly, the structural details of the pin contacts and the arrangement from mounting them within the plug and shells to achieve a high resistance to internal arcing at high frequencies and high voltages, while at the same time providing a good alignment for a low insertion force and a reliable gas seal, will also readily occur to those skilled in the art. As one example, while the invention has been described with respect to radially projecting bosses formed on the pin and socket contacts, or their associated barrier sleeves, it will be understood that a similar effect could be achieved with an insulator body having a projecting boss which mates with a recess formed in the contact or barrier sleeve. Similarly, the location of the O-ring seals within the plug and receptacle can be moved still remaining within the scope of the present invention. Still further, while one particular system utilizing nested plug and receptacle shells, retaining rings, and a rotatable locking them and describe to secure the components and guide them into a fixed mating relationship, alternative mechanical arrangements are possible such as plug and shell receptacles which are pressed into an end-abutting relationship by a screw-on lock, or any of a variety of well known replaceable latching or securing arrangements. These and other modifications and variations are intended to fall within the scope of the appended claims.

What is claimed is:

1. A pneumatic-electric connector for connecting and disconnecting a plasma arc torch to and from (i) an electrical power supply having a high current D.C. output for normal operation of the torch and (ii) at least one gas supply, comprising
   a receptacle shell and a plug shell that mate with one another through a mutual axial movement along their respective longitudinal axes,
   at least one pin contact having a central passage extending longitudinally therethrough,
   at least one socket contact having one end adapted to receive one end of said pin contact and make electrical connection with it over a connection zone to connect the power supply and the torch electrically, said socket contact having a central passage extending longitudinally therethrough,
   said longitudinally extending passages being sized to conduct gas from the gas supply to the torch at a rate sufficient to cool said contacts to allow the contacts to carry the high current despite a relatively small cross-sectional area,
   an insulator body disposed in each of said shells,
   said insulator bodies being sized and configured to provide a tracking distance sufficient to resist arcing within the connector.

2. The connector according to claim 1 wherein said connector also electrically connects a high-voltage and high-frequency between the power supply and the torch and further comprising barrier sleeves of an insulating material surrounding each of said pin and socket contacts, said barrier sleeves acting in cooperation with said insulator bodies to provide said tracking distance sufficient to resist arcing within said connector.

3. The connector according to claim 1 further comprising a plurality of low power control contacts mounted in said insulating bodies and dimensioned to break electrical connection with one another during said mutual axial movement on disconnect before said pin and socket contacts break with one another during the same movement on disconnect.

4. The connector according to claim 1 wherein said socket contacts are split at their ends adjacent said pin contacts with a surrounding annular clearance at said split ends to allow said socket end to spread radially outwardly upon the insertion of said pin contact to develop a spring force that enhances the electrical connection between said pin and socket contacts.

5. The connector according to claim 1 further comprising means for mounting and sealing each of said pin and socket contacts and their associated barrier sleeves within said insulator bodies such that (i) said contacts are each pivotable about their longitudinal axes to provide an automatic self alignment as said receptacle and plug shells mate through said mutual axial movement and (ii) said gas conducted through said contacts is sealed reliably at the interface between said plug and receptacle shells against a flow away from said connection zone.

6. The connector according to claim 5 wherein said barrier sleeves and said associated contacts have mutually mating tranverse recesses and projections to lock the barrier sleeves against axial movement with respect to the contact.

7. The connector according to claim 5 wherein said mounting and sealing means includes a boss formed integrally with said barrier sleeves and projecting radially outwardly from the associated contact.

8. The connector according to claim 5 wherein said mounting and sealing means includes an O-ring in an abutting, sealing relationship with the outer surface of said barrier seal and at least one of said insulator bodies to block a flow of the gas from said connection zone.

9. The connector according to claim 8 wherein said O-rings associated with said pin contacts (i) are held in a bevel groove in said insulator body in said plug shell and (ii) they abut the end face of said insulator body in said receptacle shell so that the movement of said shells on mating compresses said O-rings to enhance their seal.

10. The connector according to claim 1 or 5 wherein said insulator bodies in each of said shells is formed in two axially spaced components having interior recesses adapted to receive, capture and axially secure against movement of said contacts.

11. The connector according to claim 1 further comprising means for replacebly securing said plug and receptacle shells in a mating relationship.

12. The connector according to claim 11 wherein said securing means comprises a locking nut rotatable on one of said shells and threaded onto the other of said shells.

* * * * *